United States Patent

Takei

[19]

[11] Patent Number: 5,831,352
[45] Date of Patent: Nov. 3, 1998

[54] DRIVE APPARATUS OF A DIRECT CURRENT LINEAR MOTOR HAVING TWO OR MORE MOVABLE TABLES

[75] Inventor: Seiji Takei, Kanagawa, Japan

[73] Assignee: Nippon Thompson Co., Ltd., Tokyo, Japan

[21] Appl. No.: 5,592

[22] Filed: Jan. 12, 1998

Related U.S. Application Data

[63] Continuation of Ser. No. 352,147, Dec. 1, 1994, abandoned.

[30] Foreign Application Priority Data

Dec. 3, 1993 [JP] Japan .................................. 5-339654

[51] Int. Cl.$^6$ .................................................. H02K 41/02
[52] U.S. Cl. .................................................. 310/12
[58] Field of Search ........................... 310/12, 13, 68 B; 318/135

[56] References Cited

U.S. PATENT DOCUMENTS

| | | | |
|---|---|---|---|
| 5,023,495 | 6/1991 | Ohsaka et al. | 310/12 |
| 5,225,725 | 7/1993 | Shiraki et al. | 310/12 |
| 5,530,303 | 6/1996 | Takei | 310/12 |

FOREIGN PATENT DOCUMENTS 1110042 4/1989 Japan .

*Primary Examiner*—Clayton E. Laballe
*Attorney, Agent, or Firm*—Sughrue, Mion, Zinn, Macpeak & Seas, PLLC

[57] ABSTRACT

A direct current linear motor including a primary side having plural armature coils, and a secondary side having two movable tables each with a field magnet. The primary and secondary sides are disposed for relative motion, and the field magnet on each movable table is disposed in opposition to the armature coils. The field magnet on one movable table is offset in a first direction transverse to a direction of relative motion of the primary side and the secondary side, and the field magnet on the other movable table is offset in a second direction opposite the first direction. A first group of position detection devices is disposed on one side of the armature coils, and a second group of position detection devices is disposed on an opposite side of the armature coils. Each one of the position detection devices of the first group and the second group correspond to a respective one of the armature coils. For each armature coil, the position detection device of the first group is disposed proximate one corner of the armature coil and the position detection device of the second group is disposed proximate a diagonally opposite corner of the armature coil.

2 Claims, 9 Drawing Sheets

DRIVE APPARATUS OF A DIRECT CURRENT LINEAR MOTOR HAVING TWO OR MORE MOVABLE TABLES

This is a continuation of application Ser. No. 08/352,147 filed Dec. 1, 1994 now abandoned.

BACKGROUND OF THE INVENTION

1. Field of the Invention

The present invention relates to a direct current linear motor commonly used for moving an object to be moved with high accuracy in, for example, a motion mechanism such as a machine tool or industrial robot, and more particularly, to a moving magnet type of linear direct current motor having two or more movable tables.

2. Description of the Prior Art

An example of this type of direct current linear motor of the prior art is disclosed in Japanese Laid-Open Patent Publication No. 1-110042. The following provides an explanation of said direct current linear motor of the prior art using FIGS. 1 and 2.

As shown in FIG. 1, moving magnet type of linear DC brushless motor 101, having two movable tables, is equipped with long plate-shaped stator base 102 composed of a magnetic substance that forms a stator yoke. Linear guide projection 103, having a horizontal cross-section in the shape of a triangle, is formed into a single structure to compose a linear guide by protruding to the outside on the lateral surface of this stator base 102. A printed circuit board not shown is arranged on the upper surface of stator base 102, and stator armature 107, employing a coreless structure, is formed by adjacently arranging armature coils 104 in close contact so as not to overlap on top of said printed circuit board.

The following provides an explanation of armature coils 104. Hollow center armature coil group 104, formed by winding with a large number of turns of a conductor so that it is of the hollow center type on a rectangular frame, is arranged on the above-mentioned stator base 102 so as not to mutually overlap.

Each armature coil 104 is arranged adjacent to another armature coil 104 so that it does not overlap said other armature coil 104.

In addition, according to this hollow center armature coil group 104, each armature coil is formed by winding so that, when the width of a single magnetic pole of field magnets 105 and 106 to be described later is taken to be T, the open angles of effective conducting portions 104a and 104b that contribute to generation of thrust become the open angle of said single magnetic pole width T. This enables the use of an electrical system that produces a linear stroke of 180° for good efficiency and performance. Furthermore, in each armature coil 104, conducting portions 104c and 104d, which are square to the direction of movement of a needle to be described later, are conducting portions that do not contribute to generation of thrust.

A first position detection device group 108 and a second position detection device group 109 are arranged on stator armature 107, on which a large number of armature coil groups 104 are arranged on stator base 102. Hall ICs, Hall elements and electromagnetic conversion devices such as electromagnetic resistors can be used for position detection devices 108 and 109. First position detection device group 108 is arranged on stator base 102 of one of the lateral surfaces of stator armature 107 from which one of effective conducting portions 104a that contributes to generation of thrust of each armature coil group 104 extends so as to enable it to detect only the N and S magnetic poles of a first field magnet 105 arranged on the lower surface of a first moving element 110 not shown. Second position detection device group 109 is arranged on stator base 102 on the other lateral surface of stator armature 107 from which the other effective conducting portion 104a that contributes to generation of thrust of each armature coil group 104 extends so as to enable it to only detect the N and S magnetic poles of a second field magnet 106 arranged on the lower surface of a second moving element 111 not shown.

Guide rollers not shown are respectively attached so as to be allowed to roll to the lateral surfaces of first moving element 110 not shown having first field magnet 105, and second moving element 111 having second field magnet 106, and said guide rollers engage so as to be able to slide freely with linear guide projection 103 formed on both lateral surfaces of stator base 102, and are movably supported along the lengthwise direction of stator base 102.

Here, the corner conducting portions where conducting portions 104a and 104c as well as 104a and 104d of armature coil 104 intersect also contribute to generation of thrust, although only slightly. Consequently, field magnets used for field magnets 105 and 106 have a horizontal width that is equal to the horizontal width of armature coil 104, thus being able to obtain as large a thrust as possible. As a result, since both first and second position detection device groups 108 and 109 will end up detecting the magnetic poles of first and second field magnets 105 and 106 unless some action is taken to prevent this, first and second moving elements 110 and 111 end up moving on their own. In order to prevent this, field magnet 105 is arranged on the main body (not shown) of first moving element 110 shifted by a prescribed width (width of conducting portion 104d of armature coil 104) in the direction of the lateral surface of one of stator armatures 107 so that second position detection device group 109 does not detect the magnetic poles of first field magnet 105. Said first field magnet 105 then opposes armature coil group 104 on stator base 102 with a void in the axial direction in between. In the attachment of first field magnet 105 to the main body of first moving element 110 not shown, the end of the other lateral surface of field magnet 105 is located on the inside of conducting portion 104d of armature coil 104. Moreover, first field magnet 105, formed to a width that extends in the direction of one of the lateral surfaces of stator armature 107, is arranged and fixed on the main body of first moving element 110 shifted by a prescribed width (width of conducting portion 104d of armature coil 104) in the direction of one of the lateral surfaces of stator armature 107 as described above so that first position detection device group 108 is able to detect the magnetic field of magnetic poles in the vicinity of one of the lateral ends of field magnet 105.

Similarly, field magnet 106 is arranged on the main body of second moving element 111 shifted by a prescribed width (width of conducting portion 104c of armature coil 104) in the direction of the other lateral surface of stator armature 107 so that first position detection device group 108 does not detect the magnetic poles of second field magnet 106, and said second field magnet 106 opposes armature coil group 104 on the stator base with a void in the axial direction in between. In the attachment of second field magnet 106 to the main body of second moving element 111 not shown, second field magnet 106, which is formed to that having a width by which the other lateral end of field magnet 105 extends in the direction of the other lateral surface of stator armature 107, is arranged and fixed on the main body of second moving element 111 shifted by a prescribed width in the direction of the other lateral surface of stator armature 107 as described above.

The above-mentioned constitution is such that first position detection device group 108 and second position detection device group 109 are arranged by shifting by a prescribed width in advance so that first moving element 110 and second moving element 111 do not detect simultaneously.

However, as shown in FIG. 2, although first moving element 110 is driven with armature coils 104-2 and 104-3, when said first moving element 110 arrives over first position detection device $108a_2$, armature coil 104-2 is driven resulting in the generation of thrust. At this time, when second moving element 111 is stopped at the position shown in the drawing, driving to armature coil 104-2 is the result of generation of driving force when detected by first position detection device $108a_2$.

This being the case, when second moving element 111 is either stopped at or moving over the position as shown in the drawing, if first moving element 110 detects first position detection device $108a_2$, the thrust for driving first moving element 110 is generated to armature coil 104-2, thus resulting in the disadvantage of being unable to maintain a stable state. Thus, in order to prevent this first position detection device $108a_2$ from being detected in FIG. 2, although it can be considered to make field magnet 105 smaller in the lengthwise direction than first moving element 110, when this is done, the disadvantage results in which a large thrust is unable to be obtained.

SUMMARY OF THE INVENTION

In consideration of the above-mentioned disadvantages of the prior art, the object of the present invention is therefore to provide a moving magnet type of direct current linear motor having two or more movable tables wherein the thrust generated to a first movable table (or second movable table) does not have an effect on a second movable table (or first movable table), a movable table and field magnet can be formed to roughly the same size, and driving force can be reliably transmitted.

The present invention is a direct current linear motor having two or more movable tables wherein a primary side, having a coil substrate that supports armature coils and a circuit substrate that performs supply of electrical power to said armature coils, and a secondary side, having a field magnet wherein different magnetic poles are alternatively arranged and magnetized along the direction of relative movement with respect to said primary side, are arranged so that said armature coils and said field magnet are in opposition;

and is composed so as to have two or more movable tables characterized in that a first position detection device group is provided on one of the lateral surfaces of said armature so that only the magnetic poles of the field magnet of the first movable table of said two or more movable tables is detected, and power is supplied so that thrust is generated that moves said first movable table in a prescribed direction in one or more armature coil groups of armatures that oppose the field magnet of said first movable table when said first position detection device group detects the magnetic poles of the field magnet of said first movable table; and, a second position detection device group is provided on the other lateral surface of said armature so that only the magnetic poles of the field magnet of the second movable table of said two or more movable tables is detected, and power is supplied so that thrust is generated that moves said second movable table in a prescribed direction in one or more armature coil groups of armatures that oppose the field magnet of said second movable table when said second position detection device group detects the magnetic poles of the field magnet of said second movable table; and, the position detection device of said first position detection device group that contributes to generation of thrust in the direction of forward movement of said first movable table is arranged at a location at which the portion that contributes to thrust in the direction of forward movement of said first movable table and the portion that does not have an effect on thrust roughly intersect in the supplying of power to said device, while the position detection device of said second position detection device group that contributes to thrust of said second movable table is arranged at a location at which the portion that contributes to thrust in the direction of forward movement of said second movable table and the portion that does not have an effect on thrust roughly intersect in the supplying of power to said device.

DESCRIPTION OF THE PREFERRED EMBODIMENTS

The following provides an explanation of the preferred embodiments of the direct current linear motor having two or more movable tables as claimed in the present invention with reference to the attached drawings. Furthermore, since this direct current linear motor is of the moving magnet type, and the movable tables are composed in the same manner, the explanation will primarily focus on only one movable table. In addition, a detailed explanation of those constituent members that are essentially the same as those of the prior art is omitted.

The direct current linear motor as claimed in the present invention is composed of a primary side and secondary side. In these embodiments, the primary side will be explained in terms of the power supply side or stationary side, while the secondary side will be explained in terms of the moving side.

To begin with, the following provides an explanation of the guiding device that performs mutual guidance of these primary and secondary sides.

Figure 1:
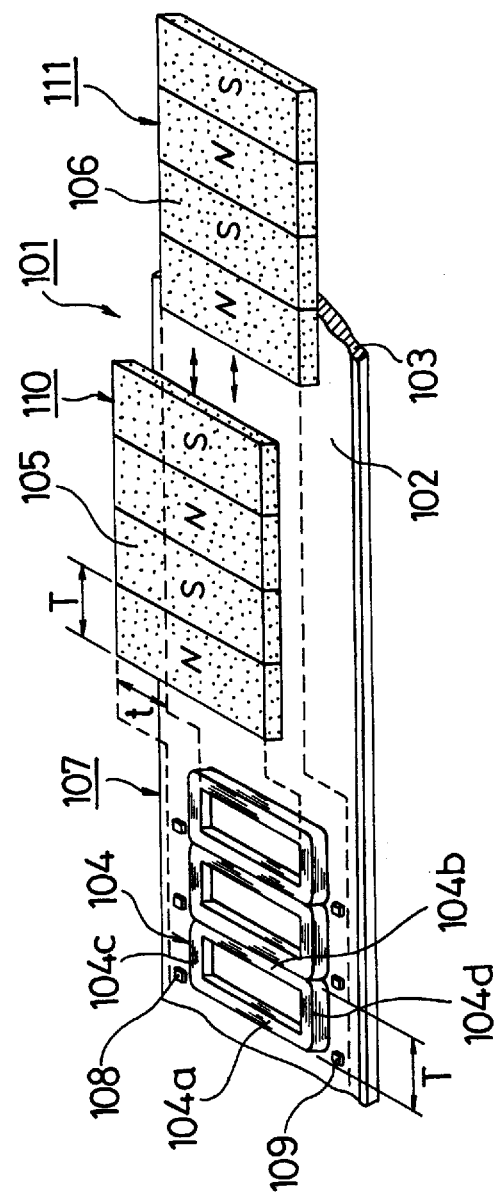
FIG. 1 is a drawing indicating one example of a direct current linear motor of the prior art.
Figure 2:
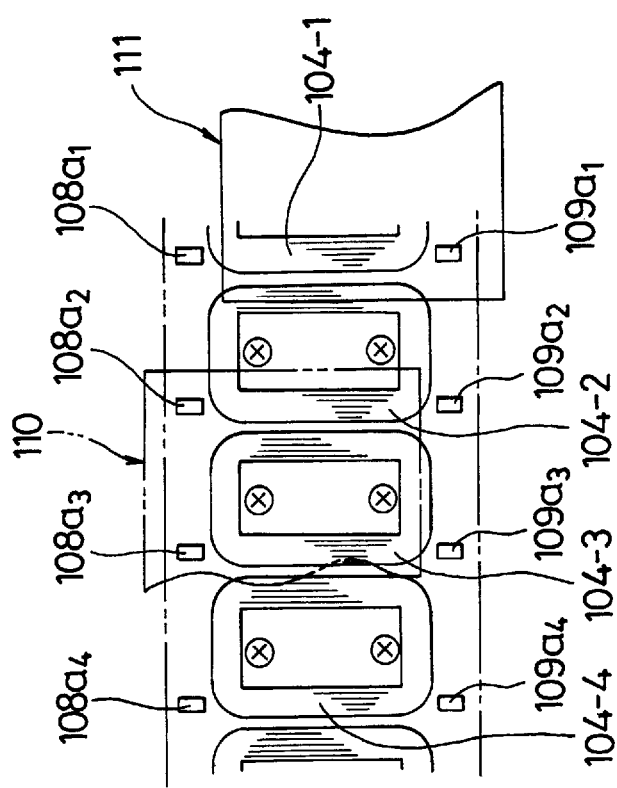
FIG. 2 is an explanatory drawing indicating the relationship between the movable tables and position detection devices shown in FIG. 1.
Figure 3:
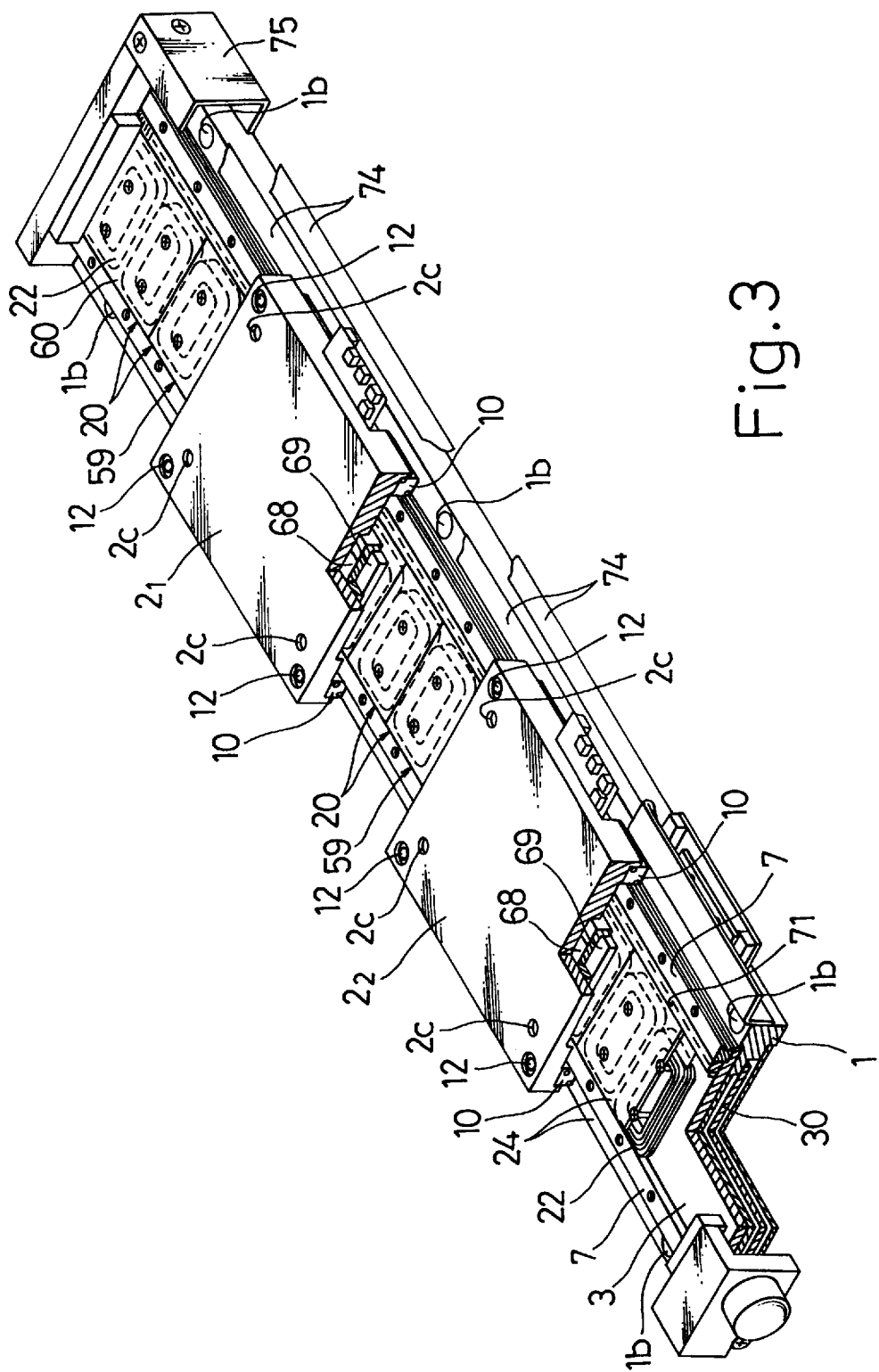
FIG. 3 is a perspective view, including a partial cross-section, of a drive unit as claimed in the present invention.
Figure 4:
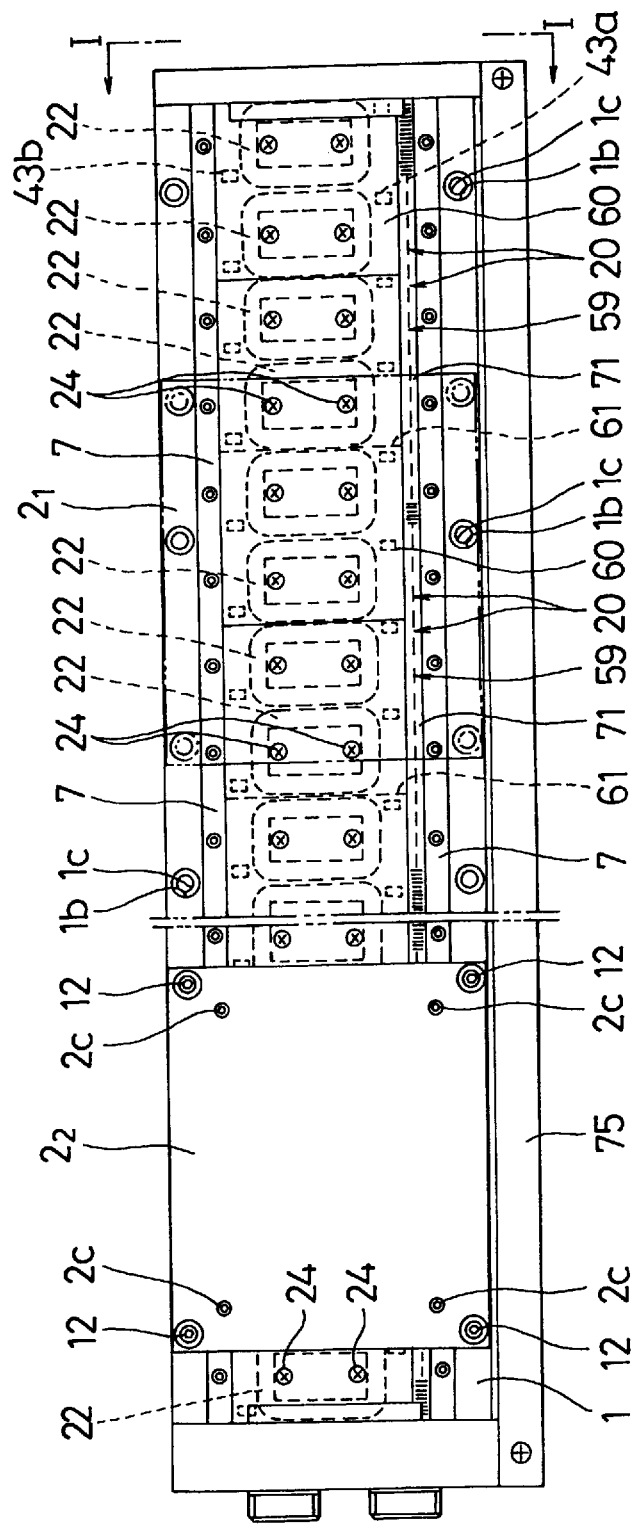
FIG. 4 is an overhead view of the drive unit shown in FIG. 3.
Figure 5:
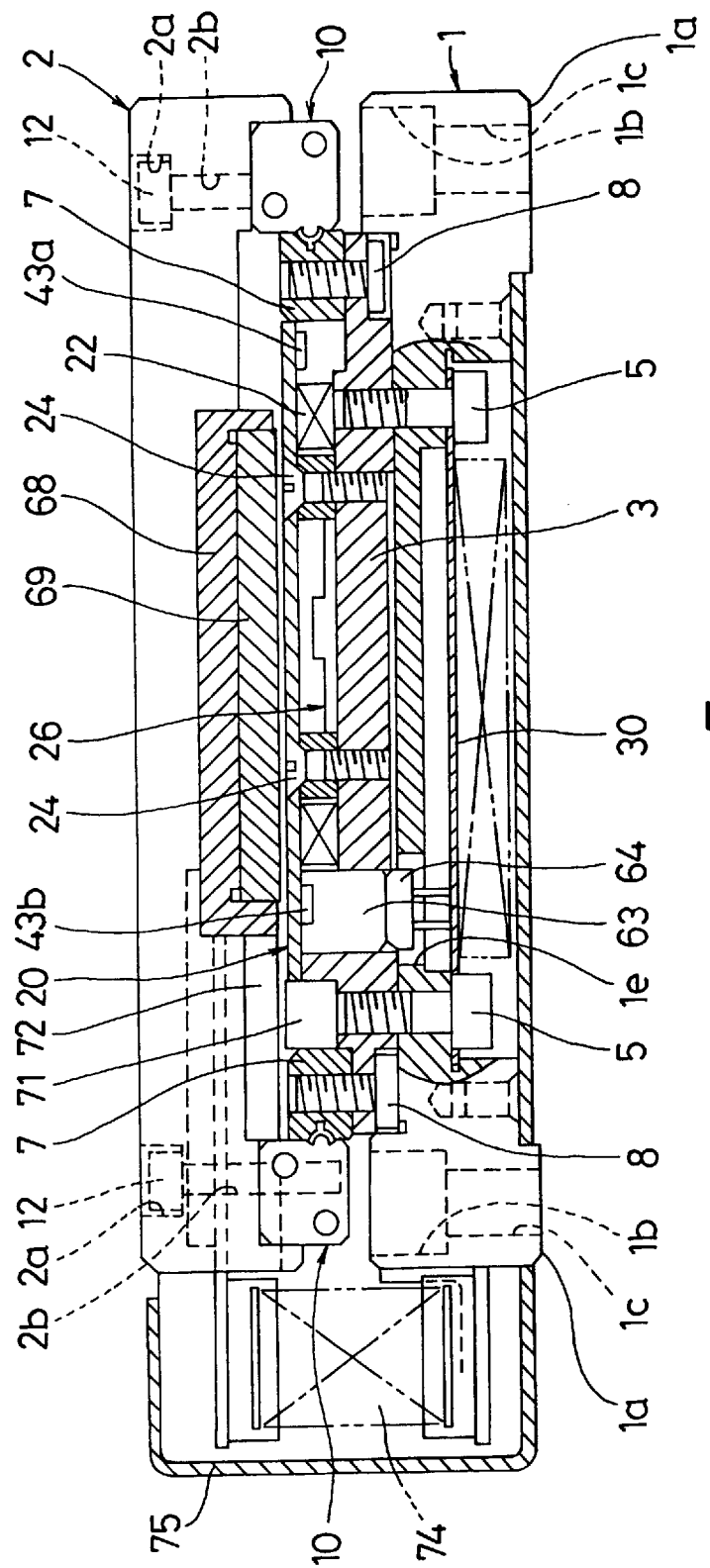
FIG. 5 is a view, including a partial cross-section, taken along arrows I—I relating to FIG. 4.

As shown in FIGS. 3 through 5, this guiding device has a base member in the form of bed 1 formed roughly into the overall shape of, for example, a rectangular plate, and a moving body in the form of table $2_1$ ($2_2$) to move along the lengthwise direction of said bed 1. In the present embodiment, two movable tables are provided, and first movable table $2_1$ and second movable table $2_2$ are able to move along the lengthwise direction of bed 1. As shown in FIGS. 3 and 5, coil yoke 3, formed into roughly the shape of a rectangular plate and having nearly the same length as bed 1, is arranged on the upper surface of said bed 1, and is fastened to said bed 1 by a plurality of bolts (with hexagon sockets, see FIG. 5) 5.

Two track rails in the form of track rails 7 are arranged on both sides of the upper surface of said coil yoke 3 along the lengthwise direction of said coil yoke 3, and are fastened to said coil yoke 3 by a plurality of flat head screws 8 (see FIG. 5).

Figure 6:
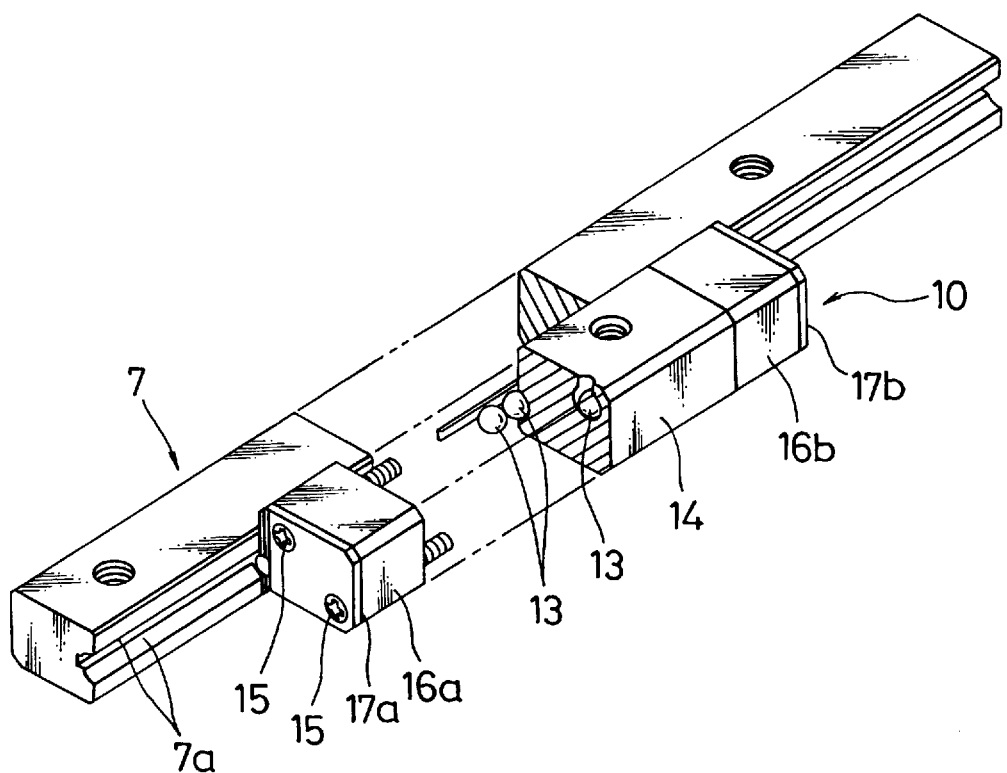
FIG. 6 is a perspective view, including a partial cross-section, of the track rail and slide member equipped on the drive unit shown in FIGS. 3 through 5.

As shown in FIG. 6, a track in the form of a single track groove 7a, having a roughly semi-circular shaped cross-section, is formed in the outside of the above-mentioned track rail 7. As is clear from FIGS. 3 and 5, a slider in the form of slide member 10, able to freely perform relative motion with respect to said track rail 7, is arranged on the outside of said track rail 7, and is fastened to the lower surface of table $2_1$ ($2_2$) by, for example, two bolts (with hexagon heads) 12. Furthermore, as shown in FIG. 5, countersunk portions 2a and insertion holes 2b are formed in table $2_1$ ($2_2$) into which the head portions and threaded portions, respectively, of bolts 12 are inserted. Bolts 12 are embedded in these countersunk portions 2a and insertion holes 2b, and do not protrude from the upper surface of table 2.

A rolling element circulating path (not shown) is formed in the above-mentioned slide member 10, and rolling elements in the form of a large number of balls 13 are arranged and contained within said rolling element circulating path. These balls 13 bear the load between track rail 7 and slide member 10 by circulating while rolling over track groove 7a of track rail 7 accompanying movement of slide member 10 with respect to track rail 7.

As shown in FIG. 6, the above-mentioned slide member 10 has casing 14, a pair of end caps 16a and 16b coupled to both ends of said casing 14 by countersunk head screws 15, and two seals 17a and 17b fastened to the outer surfaces of both of said end caps 16a and 16b. The above-mentioned rolling element circulating path is composed of a load bearing track groove and return path formed in casing 14 mutually in parallel and passing linearly through said casing 14, and a pair of roughly arc-shaped direction changing paths formed in both end caps 16a and 16b that connect both ends of said load bearing track groove and return path. Furthermore, said load bearing track groove opposes track groove 7a of track rail 7.

The guide unit of the constitution described above is fastened to a flat mounting surface equipped on, for example, a machine tool (not shown) by a plurality of bolts (with hexagon sockets: not shown). Consequently, as shown in FIG. 5, bed 1 has flat mounting bottom surface 1a for anchoring said bed 1 to said mounting surface. As shown in FIGS. 3 through 5, countersunk portions 1b and insertion holes 1c are formed in both sides of bed 1 into which the head portions and threaded portions of the above-mentioned bolts for fastening said bed are respectively inserted. Said bolts are embedded in these countersunk portions 1b and insertion holes 1c, and do not protrude from the upper surface of bed 1. In addition, as shown in FIGS. 3 and 4, for example, four threaded holes 2c are formed in the four corners of the upper surface of table $2_1$ ($2_2$) able to move with respect to this bed 1, and a table (not shown) equipped on an apparatus on which said drive unit is equipped is fastened to said table $2_1$ ($2_2$) by bolts (not shown) screwed into these threaded holes 2c.

Continuing, the following provides a detailed description of the primary and secondary sides of the direct current linear motor that is mutually guided by the guide unit having the constitution described above.

Figure 7:
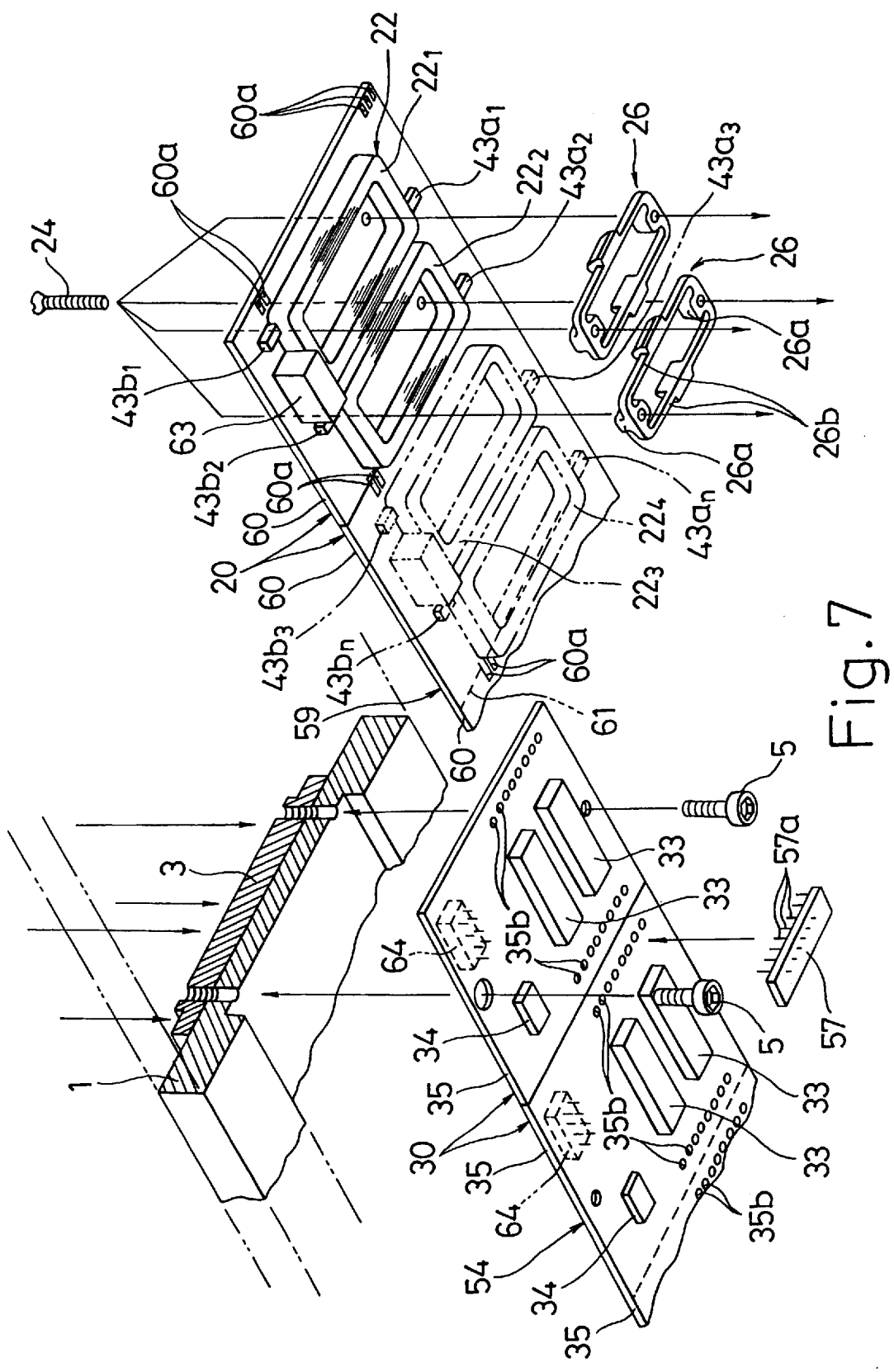
FIG. 7 is an exploded perspective view, including a partial cross-section, of the essential portion of a direct current linear motor contained in the drive unit shown in FIGS. 3 through 5.

To begin with, as shown in FIGS. 3 through 5 and 7, the primary side has the previously described coil yoke 3 installed on bed 1, coil substrate 20 arranged along the lengthwise direction of said coil yoke 3 on the upper surface of said coil yoke 3, and, for example, 14 armature coils 22 supported by being affixed in a row along the direction in which the above-mentioned table $2_1$ ($2_2$) is to move on the lower surface of said coil substrate 20, namely the side of coil yoke 3. Furthermore, each armature coil 22 is wound into roughly the shape of a rectangular loop. In addition, as shown in FIGS. 5 and 7, Hall effect elements 43a ($43a_1$ through $43a_n$) and 43b ($43b_1$ through $43b_n$) are provided corresponding to each armature coil 22 on coil substrate 20.

These Hall effect elements 43a and 43b are for supplying power to armature coils 22 for detecting first movable table $2_1$ and second movable table $2_2$ and driving said tables.

Figure 8:
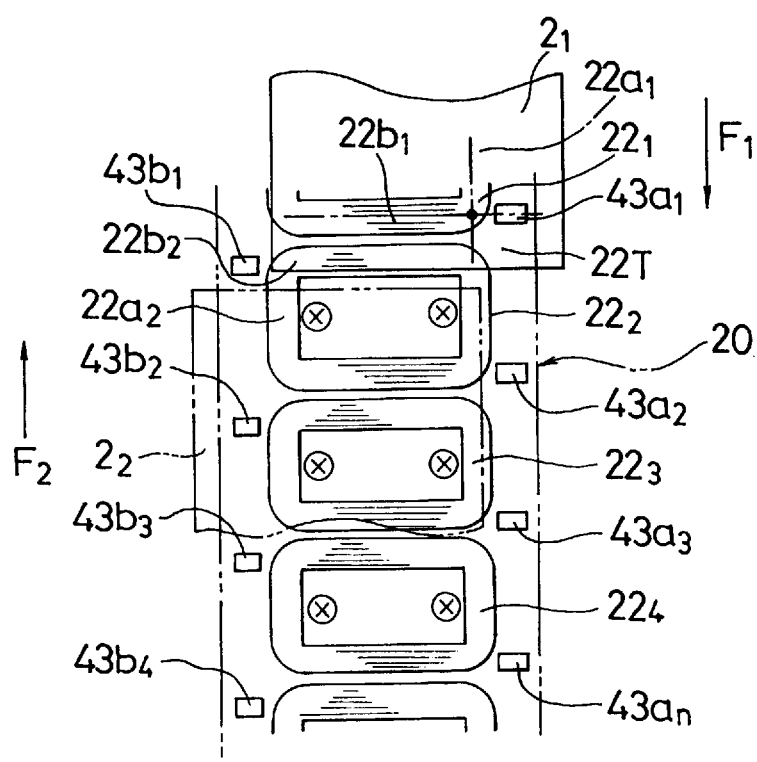
FIG. 8 is an explanatory drawing indicating the relationship between the movable tables and the position detection devices as claimed in the present invention.
Figure 9:
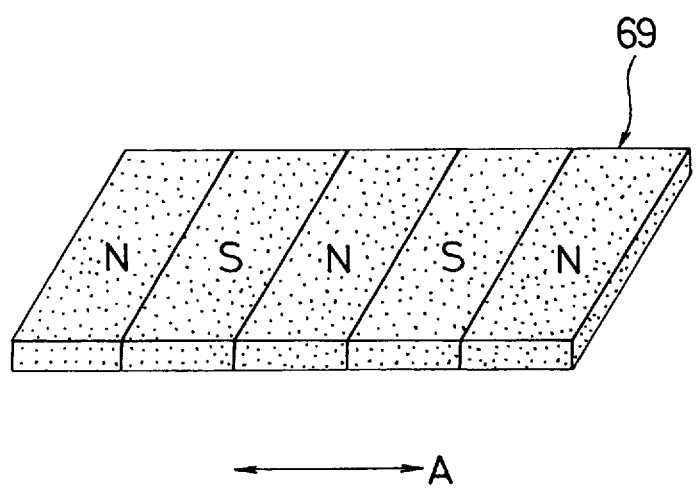
FIG. 9 is a perspective view of a field magnet that is a constituent member of the secondary side of the direct current linear motor contained in the drive unit shown in FIGS. 3 through 5.

As is specifically shown in FIG. 8, Hall effect element $43a_1$ for detecting and driving first movable table $2_1$ is arranged within outside region $22_T$ at the location where the hypothetical center lines of portion $22b_1$, which contributes to thrust of armature coils 22, and portion $22a_1$, which does not contribute to thrust, roughly intersect. As a result, even when first movable table $2_1$ arrives at the location shown in FIG. 8, since Hall effect element $43a_2$ for turning on armature coil $22_2$ is not detected, armature coil $22_2$ is not turned on. On the other hand, when second movable table $2_2$ is at the location shown in FIG. 8, Hall effect element $43b_2$ is in the on state. Moreover, since Hall effect element $43b_1$ for driving armature coil $22_2$ is in the off state, the thrust for driving first movable table $2_1$ and second movable table $2_2$ is reliably transmitted to those respective tables, thus preventing their mutual interference.

Furthermore, the arranging of field magnet 69 of first movable table $2_1$ and second movable table $2_2$ so that it is shifted by a prescribed width so that Hall effect elements 43a and 43b are not simultaneously detected is the same as in the prior art, and this is illustrated in FIG. 5. In addition, as a result of employing this constitution, first movable table $2_1$, second movable table $2_2$ and field magnet 69 can be composed to roughly the same length in the lengthwise direction indicated by, for example, arrows $F_1$ and $F_2$ in FIG. 8. In other words, their lengths in the direction of movement of the tables are approximately equal. Together with enabling a large thrust to be obtained, even in the case both tables are used when approaching each other, there is no mutual interference between the thrust generated, thus enabling driving force to be reliably transmitted.

Each of the above-mentioned armature coils 22 and coil substrate 20 are fastened together to coil yoke 3 with said coil substrate 20 on the outside by fastening members in the form of countersunk head screws 24, two each, for example, of which are inserted for each of said armature coils 22.

As shown in FIGS. 5 and 7, spacer assemblies 26 are juxtaposed between coil substrate 20, fastened by countersunk head screws 24, and coil yoke 3 into which said countersunk head screws 24 are screwed. These spacer assemblies 26 are provided so that deformation, such as warping and so forth, does not occur in coil substrate 20 caused by tightening of countersunk head screws 24, and are fit inside each armature coil 22.

Both couplings 26b provided between two spacers 26a have elasticity. When spacer assemblies 26 are installed, they are locked on the inside surface of armature coil 22 due to the elasticity of said couplings 26b. The following effects are demonstrated as a result of employing this constitution.

Namely, when coil substrate 20 is fastened to coil yoke 3 by countersunk head screws 24, since each armature coil 22 is affixed in advance to the lower surface of coil substrate 20 as shown in FIG. 7, coil substrate 20 is placed on coil yoke 3 while installing spacer assemblies 26 on the inside of these armature coils 22. In this state, countersunk head screws 24 are screwed in to perform fastening. At this time, when spacer assemblies 26 are pushed in and inserted in armature coils 22, said spacer assemblies 26 are securely locked to said armature coils 22 due to the elasticity of couplings 26b equipped on said spacer assemblies 26. Thus, even if the pushing force is removed, spacer assemblies 26 do not come out, thereby facilitating easy assembly.

Next, the following provides an explanation of the circuit substrate for performing supply of electricity and so forth to each of the above-mentioned armature coils 22.

As shown in FIGS. 3, 5 and 7, this circuit substrate 30 is arranged in parallel with coil substrate 20 on the lower surface of bed 1 on which said coil substrate 20 is installed on its upper surface with coil yoke 3 in between. Moreover, said circuit substrate 30 is fastened to said bed 1 by a plurality of bolts (with hexagon sockets) 5. Furthermore, these bolts 5 serve to fasten the above-mentioned coil yoke 3 to bed 1.

As shown in FIG. 7, the above-mentioned circuit substrate 30 is composed by joining together a plurality of separate portions 35, each provided with a drive circuit composed of electronic components 33, 34 and so forth. These separate portions 35 are provided corresponding to each unit of two armature coils among fourteen of each armature coil 22 arranged in a row. Thus, the number of these separate portions 35, in this case, is seven.

The drive circuit provided on each of the above-mentioned separate portions 35 contains one set of circuit portions supplying excitation current to one armature coil 22, or in other words, a circuit corresponding to two armature coils 22.

Furthermore, in FIG. 7, connection between the above-mentioned separated separate portions 35 and base substrate 54 is performed by a single connection component 57 having terminals 57a fit into through holes 35b provided at the connection terminal portions 35a. Furthermore, although connection between corresponding connection terminal portions 35a may be performed using copper wire and so forth, by performing connection using this type of connection component 57 with connection terminals 35a of separate portions 35 arranged on each terminal in the direction of connection as described above, in addition to connection of all connection terminals 35a being able to be performed all at once, connections are reinforced due to the rigidity of said connection component 57. In addition, besides using components that simply act to make electrical connections, electronic components such as IC and so forth may also be used for connection component 57.

The following provides an explanation of coil substrate 20.

Although the overall coil substrate 20 is not shown, in the case of fabricating this coil substrate 20, a base substrate 59 of a length nearly equal to base substrate 54 for the above-mentioned circuit substrate 30 is made available as shown in FIG. 7. This base substrate 59 is composed by linking together six separate portions 60 into a single unit in the same manner as base substrate 54 for circuit substrate 30. As shown in the drawing, two armature coils 22 each are affixed, grouped together in units, on these six separate portions 60, thus making the total number of armature coils 22 arranged in a row on base substrate 59 twelve. Furthermore, as shown in FIGS. 7 and 4, marks in the form of broken lines 61 are printed on the surface of base substrate 59 to distinguish these separate portions 60. As shown in FIG. 7, circuit substrate 30 is formed by joining and connecting a single separate portion 60 separated from another base substrate not shown to one end of this unseparated base substrate 59. Furthermore, in FIG. 7, reference numeral 60a indicates connection terminals provided on each said separate portion 60.

However, in the description thus far, although two armature coils 22 each and a drive circuit for driving said armature coils 22 are separated into units with respect to coil substrate 20 and circuit substrate 30, three or more armature coils and their drive circuit may also be separated into their respective units. In addition, although base substrate 54, which supports twelve armature coils 22, and base substrate 59, on which a plurality of drive circuits are arranged in a row corresponding to two of these armature coils 22 each, are made available during fabrication of the drive unit equipped with a total of fourteen armature coils 22 in the present embodiment, it is only natural that the setting of the total length of these base substrates 54 and 59, namely the numbers of armature coils and drive circuits to be equipped on these, can be suitably changed.

In addition, although coil substrate 20 and circuit substrate 30 are composed by separating at least one of separate portions 35 and 60 provided on base substrates 54 and 59, and joining it to unseparated base substrates 54 and 59 in the present embodiment, in the case the operating stroke of the drive unit to be fabricated is shorter than the total length of base substrates 54 and 59, at least one of each of separate portions 35 and 60 provided on each of said base substrates 54 and 59 should be cut away as necessary.

Furthermore, as shown in FIGS. 5 and 7, coil substrate 20 and circuit substrate 30, which are arranged to be mutually separated by bed 1 and coil yoke 3, are connected by connecting a plurality of, in this case seven, of connection devices in the form of both corresponding male and female connectors 63 and 64 provided on mutually opposing sides of both said substrates. One each of these connectors 63 and 64 is arranged with respect to each separate portion 35 and 60 each provided with two armature coils 22 and their drive circuit grouped into a unit as previously described. As shown in FIG. 3, said connectors 63 and 64 are mutually connected through apertures 1e and 2e formed in bed 1 and coil yoke 3. Thus, since one each of connectors 63 and 64 is provided for each of separate portions 35 and 60 of coil substrate 20 and circuit substrate 30, when mutually assembling both said separate portions 35 and 60, the directions of both can be recognized both quickly and easily, thus facilitating easy assembly. Furthermore, connection of corresponding separate portions 35 and 60 may be performed by lead wires and not by connectors as described above. In addition, with respect to the number of connectors, besides providing only one connector for each of separate portions 35 and 60 as mentioned above, two or more connectors may also be provided.

On the other hand, the secondary side of the direct current linear motor is composed in the manner described below.

As shown in FIGS. 3 and 5, said secondary side has magnet yoke 68, mounted on the lower side of table 2, and field magnet 69 anchored on the lower surface of said magnet yoke 68 to oppose each of the above-mentioned armature coils 22 of the primary side. As shown in FIG. 7, the overall shape of field magnet 69 is formed into roughly that of a rectangular plate, and a plurality of N and S magnetic poles, for example 5, are magnetized so as to be alternately arranged in a row along direction A in which relative movement is performed by the primary and secondary sides, namely the lengthwise direction of bed 1.

In the drive unit having said constitution, a position detection device having the constitution described below is provided for detection of the relative positions of the above-mentioned bed 1 and table 2.

Namely, said position detection device is composed of linear magnetic scale 71 shown in FIGS. 3 through 5, and magnetic sensor portion 72 shown in FIG. 5. Said linear magnetic scale 71 extends in the direction of movement of the above-mentioned table 2, and together with a large number of N and S magnetic poles being alternately magnetized at a precise pitch along its lengthwise direction, an origin signal magnetized portion is formed on one end. On magnetic sensor portion 72, together with providing a Hall effect element for origin detection, another two Hall effect elements for the A and B phases are arranged mutually shifted by ½ the above-mentioned pitch. As a result of employing said constitution, both A phase and B phase signals are obtained, thereby enabling detection of relative position and discrimination of direction of movement.

Furthermore, as shown in FIGS. 3 through 5, cables 74 for obtaining signals from the above-mentioned magnetic sensor portion 72, and cover 75, which covers said cables 74, are provided. Said cables 74 are composed of flexible substrates.

In the direct drive guide unit having the above-mentioned constitution, by supplying a prescribed current to armature coils 22, thrust is produced based on Fleming's right hand rule between the primary and secondary sides. For example, if bed 1, to which the primary side is coupled, is taken to be the stationary side, table 2, integrated into a single unit with the secondary side, is moved by this thrust. Moreover, the position of table 2 with respect to bed 1 is detected by the position detection device described above.

Furthermore, although a guide unit having a mechanical constitution is shown for the guiding device that performs mutual guiding of the primary side and secondary side in the above-mentioned embodiments, a guiding device can be employed having a constitution that relatively levitates both primary and secondary sides by the pressure of a fluid (air or oil) or magnetic force.

In addition, although a moving magnet type of direct current linear motor is shown in the above-mentioned embodiments wherein the side containing armature coils 22 is taken to be the stationary side and the side containing field magnet 69 is taken to be the moving side, the present invention can also be applied to a moving coil type of direct current linear motor.

Moreover, the present invention can be similarly applied in the form of another embodiment in the case of bed 1 and so forth having a certain curvature, and the present invention performing curved motion.

In the direct current linear motor according to the present invention as has been explained above, since the position detection device which contributes to the thrust of a first movable table of a first position detection device group is arranged at a location at which the portion that contributes to thrust in the direction of forward movement of said first movable table and the portion that does not have an effect on thrust roughly intersect in the supplying of power to said device, while the position detection device of said second position detection device group that contributes to thrust of said second movable table is arranged at a location at which the portion that contributes to thrust in the direction of forward movement of said second movable table and the portion that does not have an effect on thrust roughly intersect in the supplying of power to said device, the present invention offers the advantages of the thrust contributing to the first movable table (or second movable table) not having an effect on the second movable table (or first movable table), and driving force is reliably transmitted. In addition, according to the present invention, since field magnets attached to the first movable table and second movable table can be formed to be roughly the same size as the tables, the present invention also offers the advantage of enabling the obtaining of large thrust.

What is claimed is:

1. A drive apparatus of a direct current linear motor having two or more movable tables, comprising:

a primary side comprising a plurality of armature coils;

a secondary side comprising two or more movable tables each having a field magnet, wherein said primary side and said secondary side are disposed for relative motion and said field magnet on each one of said movable tables is disposed so as to oppose said armature coils, wherein said field magnet on one of said movable tables is offset in a first direction transverse to a direction of relative motion of said primary side and said secondary side, and said field magnet on the other one of said movable tables is offset in a second direction transverse to the direction of relative motion of said primary side and said secondary side, said first direction and said second direction being opposite each other; and a first group of position detection devices on one side of said armature coils and a second group of position detection devices disposed on an opposite side of said armature coils, each one of said position detection devices of said first group and each one of said position detection devices of said second group corresponding to a respective one of said armature coils, wherein for each one of said armature coils, said position detection device of said first group for energizing the armature coil is disposed proximate one corner of the armature coil and in alignment with a first conductor portion of the armature coil for generating thrust, and said position detection device of said second group for energizing the armature coil is disposed proximate a diagonally opposite corner of the armature coil from said one corner and in alignment with a second conductor portion of the armature coil for generating thrust, and wherein the position detection devices of the first group are positioned to detect the field magnet offset in said first direction but not the field magnet offset in said second direction, and the position detection devices of the second group are positioned to detect the field magnet offset in said second direction, but not the field magnet offset in said first direction, whereby interference between adjacent tables caused by the same armature coil driving the adjacent tables is prevented.

2. A drive apparatus as recited in claim 1, wherein each table is substantially the same length as each field magnet as measured in the direction of relative motion of said primary side and said secondary side.

* * * * *